(12) United States Patent
Shubat et al.

(10) Patent No.: US 10,107,565 B2
(45) Date of Patent: Oct. 23, 2018

(54) GALLEY COOLING

(71) Applicant: HAMILTON SUNDSTRAND CORPORATION, Windsor Locks, CT (US)

(72) Inventors: Steve Shubat, Newington, CT (US); Donna S. Prause, Rocky Hill, CT (US); Thomas M. Zywiak, Suffield, CT (US); Donald E. Army, Jr., Enfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 812 days.

(21) Appl. No.: 13/857,316

(22) Filed: Apr. 5, 2013

(65) Prior Publication Data
US 2014/0299296 A1    Oct. 9, 2014

(51) Int. Cl.
*F28F 1/00* (2006.01)
*B64D 13/06* (2006.01)

(52) U.S. Cl.
CPC .............. *F28F 1/00* (2013.01); *B64D 13/06* (2013.01); *B64D 2013/0629* (2013.01)

(58) Field of Classification Search
CPC . F28F 9/22; F28F 2250/06; F28F 1/00; B64D 13/06; B64D 2013/0629
USPC ................. 165/110, 112, 145, 103
See application file for complete search history.

(56) References Cited

U.S. PATENT DOCUMENTS

| | | | |
|---|---|---|---|
| 5,343,632 A * | 9/1994 | Dinh | 34/507 |
| 5,660,228 A * | 8/1997 | Steege et al. | 165/76 |
| 5,927,387 A * | 7/1999 | Nystrom | 165/103 |
| 6,014,866 A * | 1/2000 | Durham | 62/201 |
| 6,094,835 A * | 8/2000 | Cromer | 34/80 |
| 6,832,504 B1 | 12/2004 | Birkmann | |
| 7,090,000 B2 * | 8/2006 | Taylor | 165/103 |
| 7,836,868 B2 * | 11/2010 | Gonzalez et al. | 123/568.12 |
| 7,854,256 B2 * | 12/2010 | Pineo et al. | 165/297 |
| 8,171,749 B2 * | 5/2012 | Lu et al. | 62/291 |
| 8,857,204 B2 * | 10/2014 | Reytblat | H05K 7/20718 62/259.2 |
| 2003/0070787 A1 * | 4/2003 | Moffitt | 165/4 |
| 2010/0000717 A1 * | 1/2010 | Finck et al. | 165/103 |
| 2011/0185752 A1 * | 8/2011 | Holzner et al. | 62/93 |
| 2012/0291459 A1 * | 11/2012 | Millar et al. | 62/79 |

OTHER PUBLICATIONS

European Search Report for European App. No. 14163216.6-1754 dated Oct. 24, 2014. 6 pp.

* cited by examiner

*Primary Examiner* — Raheena R Malik
(74) *Attorney, Agent, or Firm* — Cantor Colburn LLP

(57) ABSTRACT

A cooling module of a galley chiller system is provided including an internal chamber. A heat exchanger assembly has air and a liquid coolant flowing there through. The heat exchanger assembly includes a first heat exchanger core and a second heat exchanger core. The first heat exchanger core and the second heat exchanger core are arranged generally sequentially within the internal chamber. Heat transfer within the first heat exchanger core is limited such that a temperature of the air in the first heat exchanger core remains above freezing.

19 Claims, 4 Drawing Sheets

GALLEY COOLING

BACKGROUND OF THE INVENTION

Exemplary embodiments of this invention generally relates to aircrafts and, more particularly, a galley chiller system for use in an aircraft.

A typical commercial aircraft has several cooling systems, including a galley chiller system dedicated to refrigerating the food carts in the galleys to prevent food spoilage prior to use by the cabin attendants. These food carts have in the past been interfaced with cold air supply systems in the galley designed to cool the interiors of the food carts. Such cool air distribution systems were generally co-located with the balance of the galley and interface to the food carts by means of gaskets connecting the food carts to a plenum containing the cool air.

Aircraft galley chiller systems include a cooling module configured to cool the air that is then supplied to the food carts in the galley. A conventional cooling module includes a heat exchanger having a single, multipass core. As a result of moisture present in the airflow provided to the heat exchanger for cooling, water from the airflow may condense in the first few passes of the heat exchanger. This water may then freeze on the heat exchanger fins as it drains into the cooler section of the core. These ice formations may block the flow of air through the heat exchanger, thereby reducing the efficiency and functionality of the cooling module and the galley chiller system.

BRIEF DESCRIPTION OF THE INVENTION

According to one embodiment of the invention, a cooling module of a galley chiller system is provided including an internal chamber. A heat exchanger assembly has air and a liquid coolant flowing there through. The heat exchanger assembly includes a first heat exchanger core and a second heat exchanger core. The first heat exchanger core and the second heat exchanger core are arranged generally sequentially within the internal chamber. Heat transfer within the first heat exchanger core is limited such that a temperature of the air in the first heat exchanger core remains above freezing.

According to an alternate embodiment of the invention, a galley chiller system is provided including a galley monument including a plurality of removable carts. A fan module is fluidly coupled to the galley monument and to an adjacent cooling module. The fan module is configured to blow air through the cooling module. The cooling module is fluidly coupled to the galley monument to provide cold air thereto. The cooling module includes an internal chamber. A heat exchanger assembly has air and a liquid coolant flowing there through. The heat exchanger assembly includes a first heat exchanger core and a second heat exchanger core. The first heat exchanger core and the second heat exchanger core are arranged generally sequentially within the internal chamber. Heat transfer within the first heat exchanger core is limited such that a temperature of the air in the first heat exchanger core remains above freezing.

According to yet another embodiment of the invention, a method of cooling air in a cooling unit of a galley chiller system is provided including blowing air at a first temperature through a first heat exchanger core having a liquid coolant flowing there through. The air is cooled to a second temperature above freezing. Condensate is collected from the first heat exchanger core. The air at the second temperature is blown through a second heat exchanger core. The second heat exchanger core has liquid coolant flowing there through. The air is cooled to a third temperature.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
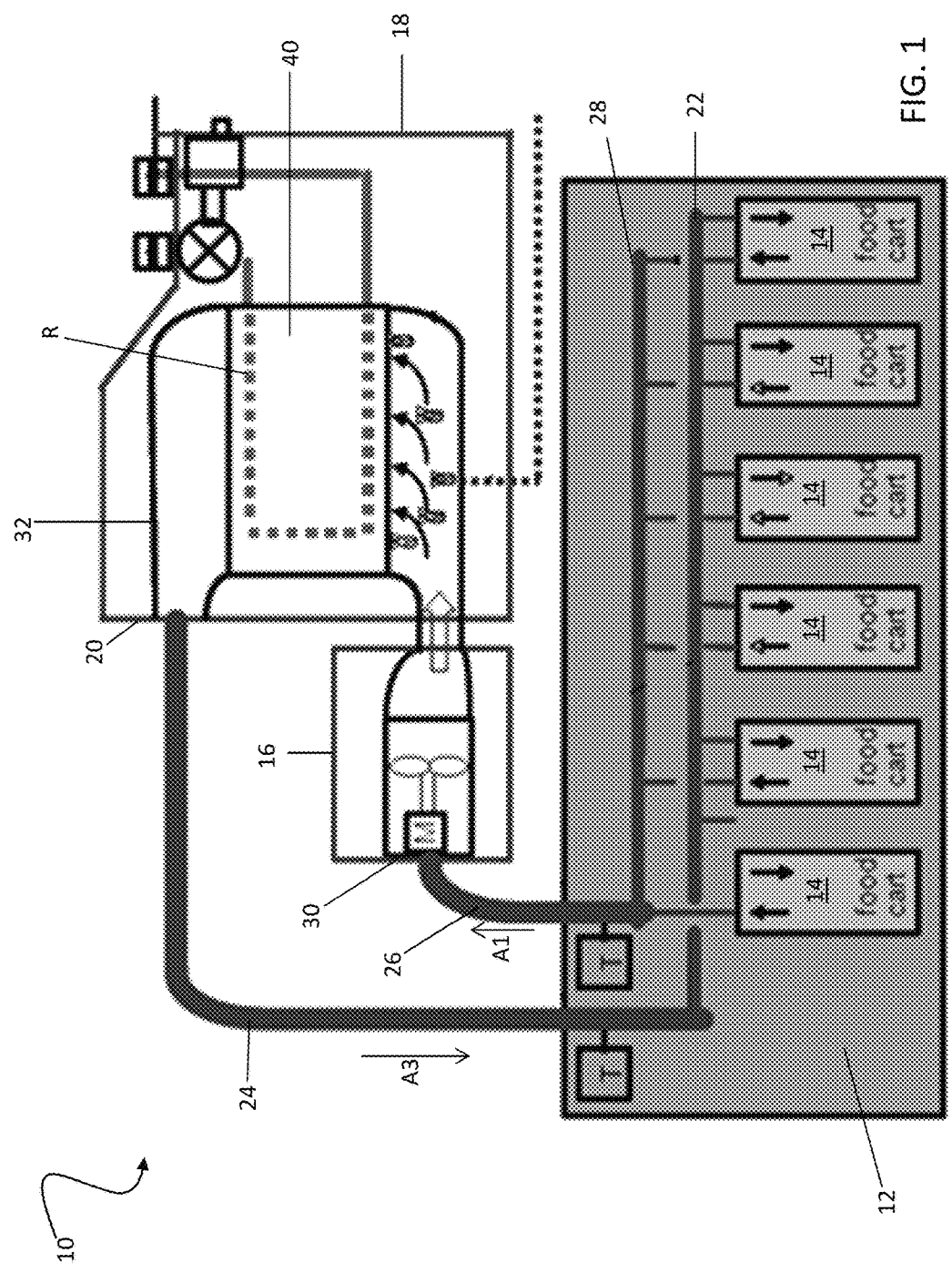
FIG. 1 is a schematic diagram of an exemplary galley chiller system of an aircraft.

Referring now to FIG. 1, an exemplary closed-loop galley chiller system 10 is illustrated including a galley monument 12 configured to store a plurality of removable food carts 14. The galley chiller system 10 additionally includes a fan module 16 operably coupled to a cooling module 18. An outlet 20 of the cooling module 18 is fluidly coupled to an inlet manifold 22 of the galley monument 12 by a first galley header 24. Similarly, a second galley header 26 fluidly couples an outlet manifold 28 of the galley monument 12 to an inlet 30 of the fan module 16. The fan module 16 is configured to blow generally warm return air through the cooling module 18. Arranged within the internal chamber 32 of the cooling module 18 is a heat exchanger assembly 40 through which a liquid coolant R flows, such as a refrigerant for example. As the air passes through the heat exchanger assembly 40, heat transfers from the warm air A1 to the liquid coolant R. The cool air A3 provided at the outlet 20 of the cooling module 18 is then supplied to the inlet manifold 22 where the air is circulated through each of the plurality of food carts 14 to cool any perishable goods stored therein. Warm air A1 returned from the carts 14 flows from the outlet manifold 28 back to the inlet 30 of the fan module 16 to complete the cycle.

Figure 2:
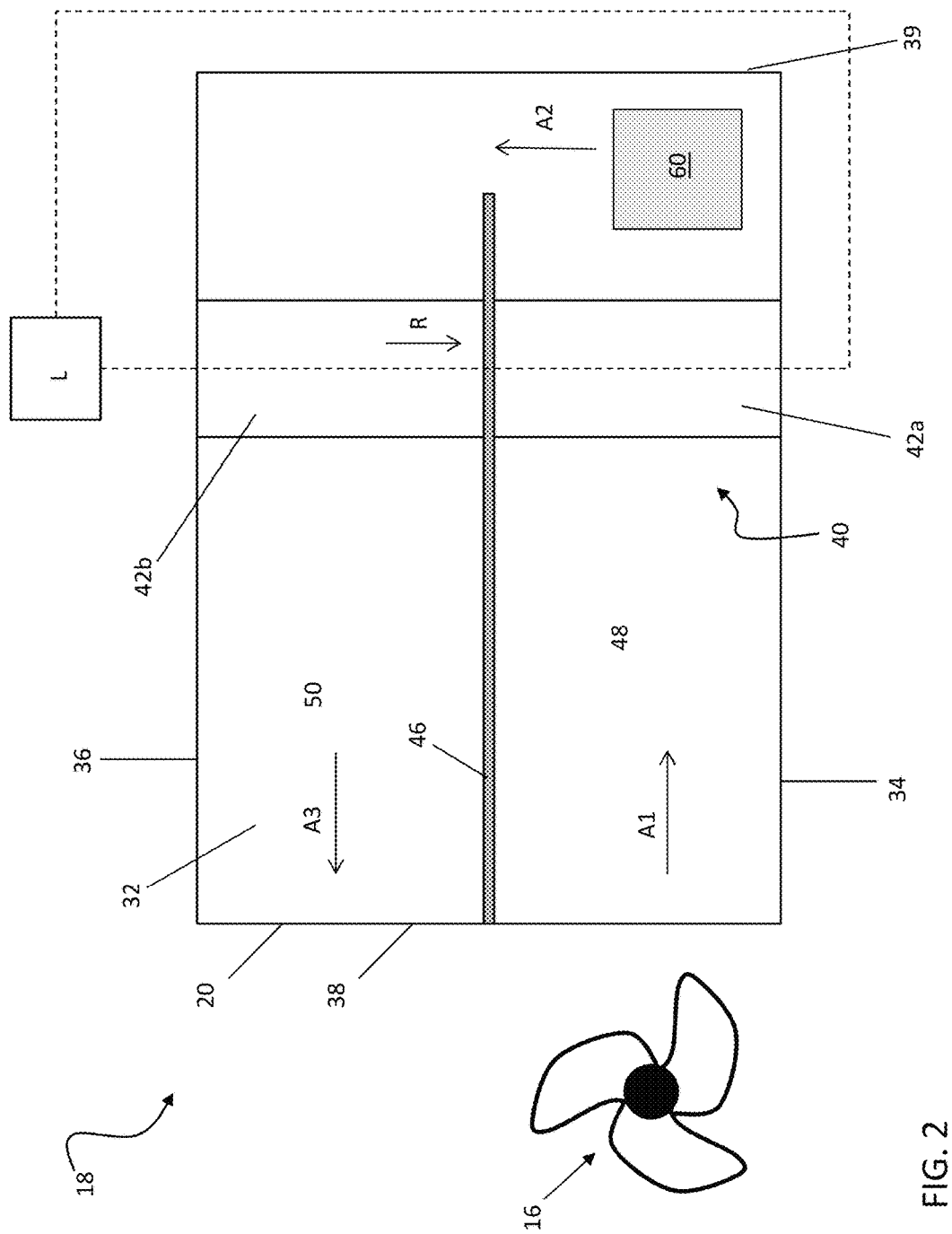
FIG. 2 is schematic diagram of a cooling module of a galley chiller system according to an embodiment of the invention.
Figure 3:
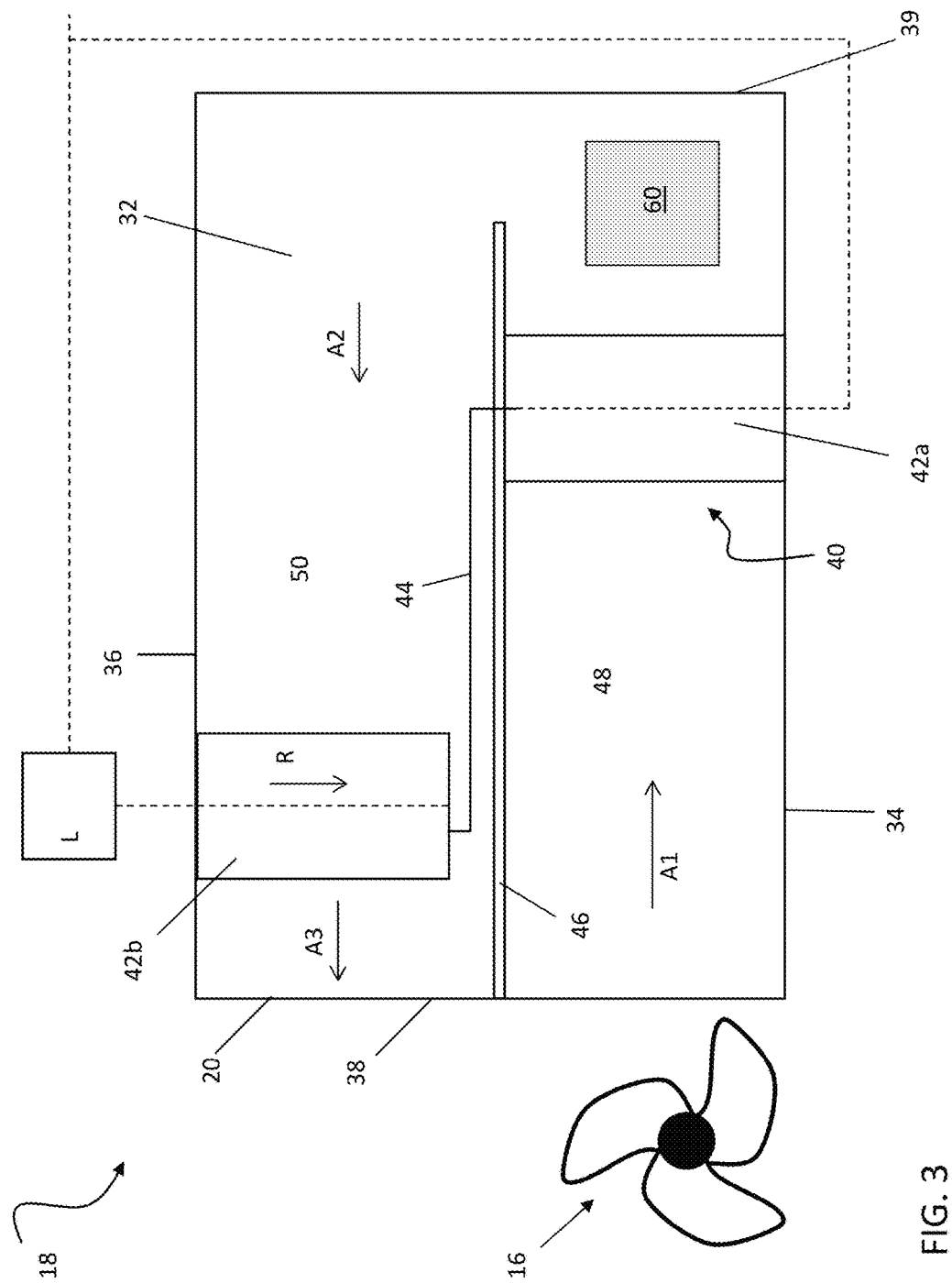
FIG. 3 is schematic diagram of a cooling module of a galley chiller system according to another embodiment of the invention.
Figure 4:
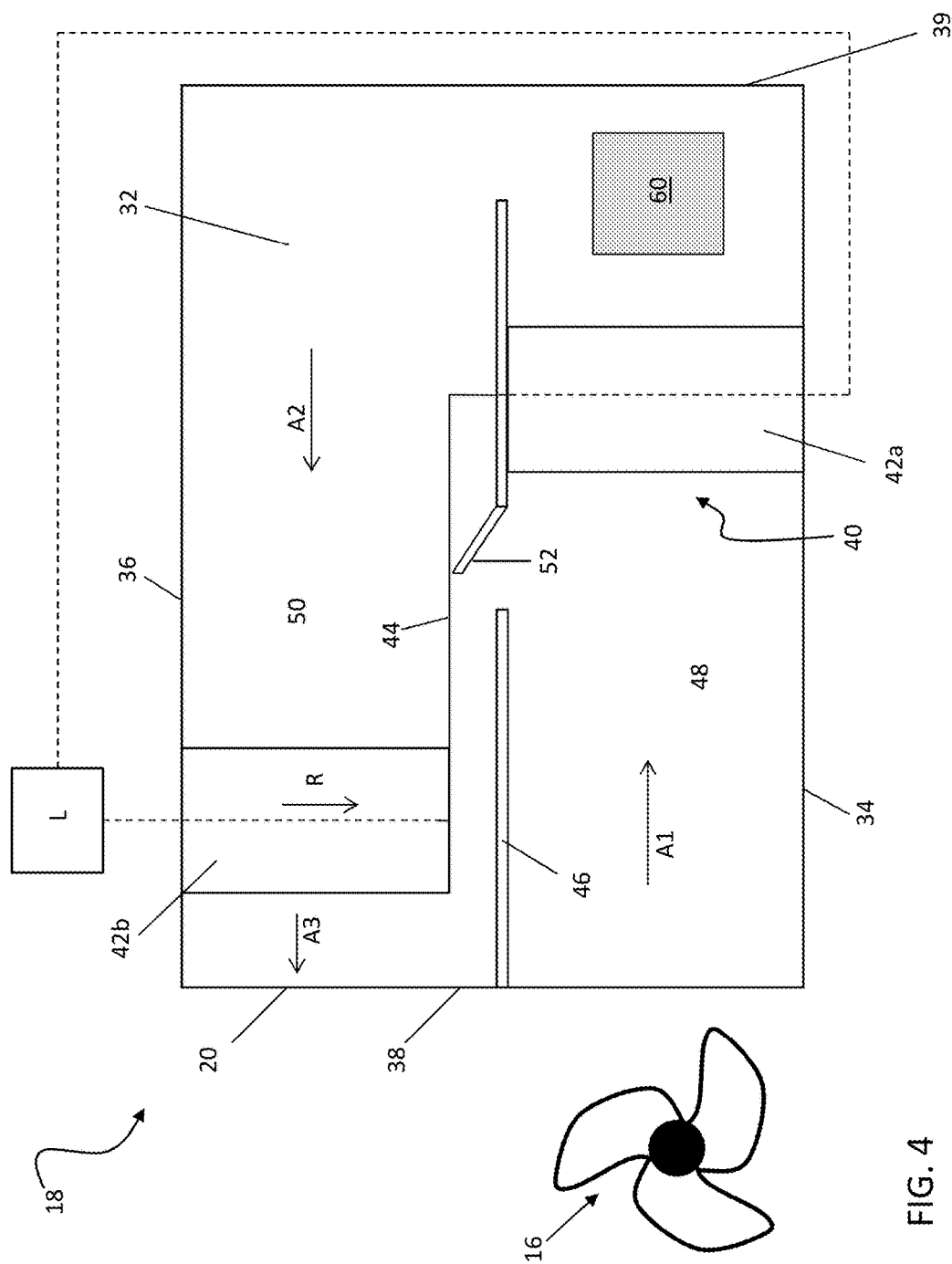
FIG. 4 is schematic diagram of a cooling module of a galley chiller system according to another embodiment of the invention.

With reference now to FIGS. 2-4, the cooling module 18 of the galley chiller system 10 is illustrated in more detail. In one embodiment, the heat exchanger assembly 40 includes multiple heat exchanger cores 42, such as a first core 42a and a second core 42b for example. The plurality of heat exchanger cores 42 are arranged within the internal chamber 32 such that air A flows sequentially through each of the plurality of cores 42. In addition, the plurality of heat exchanger cores 42 may be positioned within the cooling module 18 such that a gap exists between at least a portion of the adjacent cores 42. Although the heat exchanger assembly 40 illustrated and described herein includes two heat exchanger cores 42, an assembly 40 having any number of cores 42 is within the scope of the invention.

Each of the plurality of heat exchanger cores 42 within the heat exchanger assembly 40 may be substantially identical, or alternatively, may be different. The plurality of heat exchanger cores 42 may be configured such that the air A and the liquid coolant R are arranged in any type of flow relationship, including, but not limited to, parallel-flow, cross-flow, counter-flow, or some combination thereof for example. The plurality of heat exchanger cores 42 may also be configured such that either one or both of the air A and the liquid coolant R make any number of passes there through to achieve a desired level of heat transfer.

The first heat exchanger core 42a and the second heat exchanger core 42b may be positioned generally adjacent one another within the internal chamber 32, between a first side 34 and a second, opposite side 36 (FIG. 2). Alternatively, a vertical and/or a horizontal distance may separate the cores of the heat exchanger assembly 42 (FIGS. 3 and 4). When the cores 42 are separate by a horizontal and a vertical distance, piping 44 is used to fluidly couple the flow of liquid coolant R between the second heat exchanger core 42b and the first heat exchanger core 42a.

A divider 46 may extend from a first end 38 of the internal chamber 32 between the first heat exchanger core 42a and the second heat exchanger core 42b. In one embodiment, the divider extends in direction perpendicular to the first end 38. The divider 46 is configured to separate the internal chamber 32 into at least a first portion 48 and a second portion 50 to prevent air from flowing through both cores 42a, 42b at the same time. In one embodiment, the divider 46 extends only between the layers of the cores 42a, 42b through which the air A flows, such that the layers of both cores 42a, 42b through which the liquid coolant R is configured to flow are fluidly coupled.

Referring now to FIG. 4, the divider 46 may include a check valve 52 positioned generally between the first heat exchanger core 42a and the second heat exchanger core 42b. The check valve 52 is generally closed and is configured to balance the flow of air A1 and A2 between the first portion 48 and the second portion 50 of the internal chamber 32 when the flow path through the first heat exchanger core 42a is blocked. As a result of a blockage, such as caused by frozen condensate for example, the pressure in the first portion 48 of the internal chamber 32 will increase. When the pressure exceeds a predetermined threshold, the check valve 52 will pivot open, releasing air A1 into the second portion 50 of the internal chamber 32.

Referring again to FIGS. 2-4, cold liquid coolant R generally enters the second heat exchanger core 42b at a temperature of about 15 degrees Fahrenheit. The liquid coolant R is configured to flow from the second heat exchanger core 42b to the first heat exchanger core 42a such that the liquid coolant R in the first heat exchanger core 42a is generally warmer than the liquid coolant R in the second heat exchanger core 42b. Warm air A1 is provided to the first heat exchanger core 40a, for example at a temperature of about 45 degrees Fahrenheit. The air A2 is configured to subsequently flow through the second heat exchanger core 42b where the temperature of the air A2 is generally lower than in the first heat exchanger core 42a. In one embodiment, the temperature of the air A3 at an outlet of the second heat exchanger core 42b or the heat exchanger assembly 40 is about 30 degrees Fahrenheit.

Because the heat exchanger assembly 40 has multiple heat exchanger cores 42, the air A may be cooled in stages at each of the cores 42. As the fan module 16 blows warm air A1 into the first portion 48 of the internal chamber 32 and the first heat exchanger core 42a, heat from the air A1 transfers to the relatively warm liquid coolant R. The temperature of the liquid coolant R is lower than the temperature of the air A1 within the first heat exchanger core 42a. This initial cooling of the air A1 causes at least a portion of the water within the air A1 to condense and collect on the fins (not shown) within the heat exchanger core 42a. The heat exchanger assembly 40 is designed to limit the cooling of the air A1 in the first heat exchanger core 42a such that the temperature of the air A2 provided at an outlet of the first heat exchanger core 42a is above freezing, such as at 35 degrees Fahrenheit for example.

Since the air A1 within the first heat exchanger core 42a is maintained at a temperature above freezing, the condensed moisture within the core 42a will remain in a generally liquid state. Gravity and/or the pressure of the air A will cause buildup of any condensation on the fins (not shown) to flow from the first heat exchanger core 42a. A condensate collector 60 or drain may be positioned generally between the plurality of heat exchanger cores 42, such as at the second end 39 of the internal chamber 32 for example, to collect any condensate formed. Depending on the configuration of the heat exchanger assembly 40, a coalescing screen (not shown), configured to allow air but not to water flow there through, may be positioned between the first heat exchanger core 42a and the second heat exchanger core 42b to prevent carryover of any condensate. After the first stage of cooling, the air A2 is provided to the second heat exchanger core 42b in the second portion 50 of the internal chamber 32. The temperature of the cool air A2 is generally greater than the temperature of the liquid coolant R in the second heat exchanger core 42b. Heat from the cool air A2 transfers to the cold liquid coolant R, to further cool the air A to a desired temperature. After passing through the second heat exchanger core 42b, the air A3 is provided to the galley monument 12 via the first galley header 24. The heated liquid coolant R at the outlet of the first heat exchanger core 40a may be used by other loads, illustrated schematically as L, or cooling systems within the aircraft.

By cooling the air A of the galley chiller system 10 in stages using separate heat exchanger cores 42, the moisture condensed from the air A is more easily removed, thereby preventing the formation of flow blockages within the heat exchanger assembly 40. Because the operational efficiency of the cooling module 18 is improved, the coolant R and equipment of the cooling system of the aircraft may be reduced, thereby improving the overall efficiency of the aircraft.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A cooling module of a galley chiller system, comprising:
   an airflow inlet to direct a flow of air into the cooling module;
   an airflow outlet to direct the flow of air out of the cooling module;

an internal chamber in fluid communication with the airflow inlet and the airflow outlet, the internal chamber configured to receive the flow of air from the airflow inlet and direct the flow of air to the airflow outlet;

a heat exchanger assembly having the flow of air and a liquid coolant flowing there through, the heat exchanger assembly including a first heat exchanger core configured to cool the flow of air and a second heat exchanger core configured to further cool the flow of air arranged generally sequentially relative to the flow of the air within the internal chamber, wherein heat transfer within the first heat exchanger core is limited such that a temperature of the air in the first heat exchanger core is less than 40° F. but remains above freezing; and a conduit connecting the first heat exchanger core to the second heat exchanger core, to direct the liquid coolant directly between the first heat exchanger core and the second heat exchanger core;

wherein the airflow outlet is configured to direct the flow of air out of the cooling module after the flow of air is further cooled at the second heat exchanger core.

2. The cooling module according to claim 1, wherein the air provided at an inlet of the first heat exchanger core is at a first temperature and the liquid coolant provided at the inlet of the second heat exchanger core is at a second temperature, wherein the first temperature is above freezing, and the second temperature is less than the first temperature.

3. The cooling module according to claim 1, wherein the liquid coolant is a refrigerant.

4. The cooling module according to claim 1, wherein the first heat exchanger core and the second heat exchanger core are different.

5. The cooling module according to claim 1, wherein the first heat exchanger core and the second heat exchanger core are identical.

6. The cooling module according to claim 1, wherein the first heat exchanger core and the second heat exchanger core are separated by a first distance along a first plane.

7. The cooling module according to claim 6, wherein a condensate collector is generally positioned in the first distance between the first heat exchanger core and the second heat exchanger core.

8. The cooling module according to claim 6, wherein the first heat exchanger core and the second heat exchanger core are separated by a second distance along a second plane, the second plane being substantially perpendicular to the first plane.

9. The cooling module according to claim 8, wherein piping is used to fluidly couple a flow of liquid coolant between the first heat exchanger core and the second heat exchanger core.

10. The cooling module according to claim 1, wherein a divider extends inwardly from an end of the internal chamber to divide the internal chamber into a first portion and a second portion.

11. The cooling module according to claim 10, wherein the first heat exchanger core is positioned within the first portion of the internal chamber and the second heat exchanger core is positioned within the second portion of the internal chamber.

12. The cooling module according to claim 11, wherein the divider is configured to block only a flow of air between the first heat exchanger core and the second heat exchanger core.

13. The cooling module according to claim 11, wherein the divider includes a check valve rotatable between a closed position and an open position, the check valve being configured to rotate open such that air flows between the first portion and the second portion of the internal chamber when a pressure greater than a predetermined threshold is applied thereto, thereby bypassing the first heat exchanger core.

14. A galley chiller system, comprising:
a galley monument including a plurality of removable carts;
a fan module fluidly coupled to the galley monument and to an adjacent cooling module, the fan module being configured to blow air through the cooling module;
the cooling module being fluidly coupled to the galley monument to provide cold air thereto, the cooling module including:
an airflow inlet to direct a flow of air into the cooling module;
an airflow outlet to direct the flow of air out of the cooling module;
an internal chamber in fluid communication with the airflow inlet and the airflow outlet, the internal chamber configured to receive the flow of air from the airflow inlet and direct the flow of air to the airflow outlet;
a heat exchanger assembly disposed in the internal chamber having the flow of air and a liquid coolant flowing there through, the heat exchanger assembly including a first heat exchanger core disposed in the internal chamber configured to cool the flow of air and a second heat exchanger core disposed in the internal chamber configured to further cool the flow of air arranged generally sequentially relative to the flow of the air within the internal chamber, wherein heat transfer within the first heat exchanger core is limited such that a temperature of the air in the first heat exchanger core is less than 40° F. but remains above freezing; and
a conduit connecting the first heat exchanger core to the second heat exchanger core, to direct the liquid coolant directly between the first heat exchanger core and the second heat exchanger core.

15. A method of cooling air in a cooling unit of a galley chiller system comprising:
introducing an airflow into the cooling unit via an airflow inlet;
blowing the airflow at a first temperature through a first heat exchanger core having liquid coolant flowing there through;
cooling the airflow to a second temperature, wherein the second temperature is less than 40° F. but above freezing;
gathering condensate collected from the first heat exchanger core;
blowing the airflow at a second temperature through a second heat exchanger core having a liquid coolant flowing there through;
directing the liquid coolant directly between the first heat exchanger core and the second heat exchanger core via a conduit connecting the first heat exchanger core and the second heat exchanger core;
cooling the airflow to a third temperature lower than the second temperature; and
directing the airflow out of the cooling unit via an airflow outlet after cooling the airflow to the third temperature.

16. The method according to claim 15, wherein the condensate within the first heat exchanger core is generally a liquid.

17. The method according to claim 15, wherein the airflow causes the condensate within the first heat exchanger core to flow into a pan generally positioned between the first heat exchanger core and the second heat exchanger core.

18. The method according to claim 15, wherein a fan module adjacent to the cooling module is configured to blow the airflow through both the first heat exchanger core and the second heat exchanger core.

19. The method according to claim 15, wherein the liquid coolant is configured to flow from the second heat exchanger to the first heat exchanger.

\* \* \* \* \*